Figure 1:
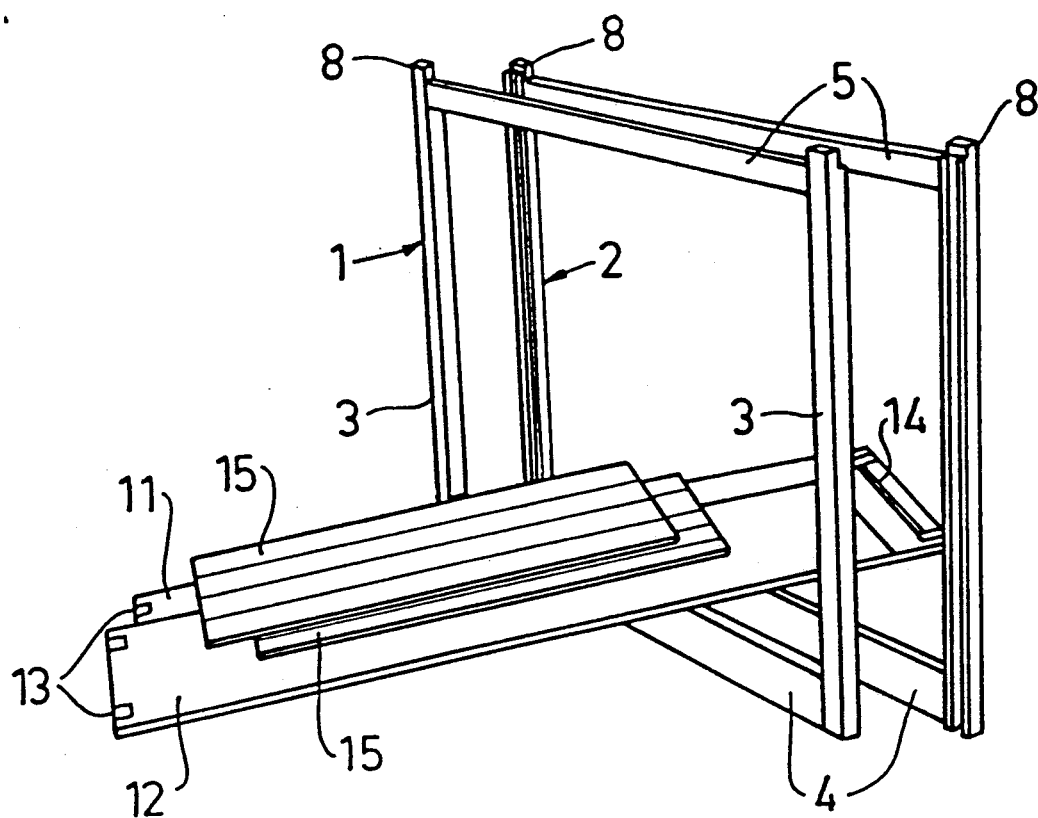

United States Patent
Wiklund

[11] Patent Number: 5,127,341
[45] Date of Patent: Jul. 7, 1992

[54] ASSEMBLABLE CARCASE

[76] Inventor: Sture Wiklund, Järnvägsgatan 1, S-9430 00 Öjebyn, Sweden

[21] Appl. No.: 623,419
[22] PCT Filed: May 22, 1989
[86] PCT No.: PCT/SE89/00285
§ 371 Date: Jan. 23, 1991
§ 102(e) Date: Jan. 23, 1991
[87] PCT Pub. No.: WO89/11239
PCT Pub. Date: Nov. 30, 1989

[30] Foreign Application Priority Data
May 25, 1988 [SE] Sweden .................. 8801941

[51] Int. Cl.⁵ .................................. A47B 47/00
[52] U.S. Cl. .................. 108/111; 211/186; 211/189
[58] Field of Search ........... 211/189, 186; 108/111, 108/153; 312/257.1, 263, 265.2, 265.3, 265.4, 265.5, 265.6

[56] References Cited

U.S. PATENT DOCUMENTS

| | | |
|---|---|---|
| 366,051 | 7/1887 | Weatherley .................. 211/186 X |
| 453,504 | 6/1891 | Rieckert ........................ 108/111 |
| 2,365,622 | 12/1944 | Bockius ....................... 211/186 |
| 2,510,243 | 6/1950 | Mohring ..................... 108/111 X |
| 2,741,524 | 4/1956 | Lew ............................. 312/265.3 |
| 2,984,362 | 5/1961 | Hamilton ..................... 108/111 |
| 3,534,517 | 10/1970 | Kann ........................ 108/111 X |
| 4,564,111 | 1/1986 | Suttles ........................ 211/189 |

FOREIGN PATENT DOCUMENTS 726448 10/1942 Fed. Rep. of Germany ... 312/265.2

Primary Examiner—Peter A. Aschenbrenner
Attorney, Agent, or Firm—Michael, Best & Friedrich

[57] ABSTRACT

Carcase for assemblable furniture including at least two carrying frames, a top (12) and a bottom (11) member. In an assembled state the carrying frames (1,2) respectively constitute a part of the front and rear sides of the assembled carcase or piece of furniture. The frames are mutually fixed with the aid of the top (12) and bottom (11) members, which have fixing means at their ends, e.g. recesses (13) accommodating the posts (3) of the carrying frames.

16 Claims, 6 Drawing Sheets

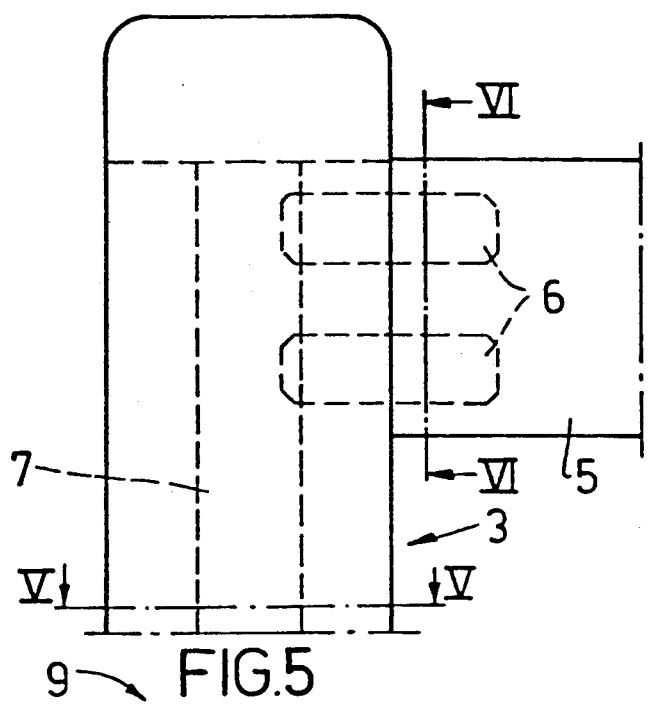
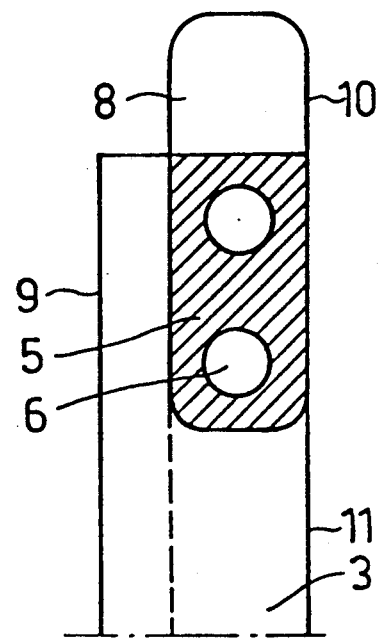
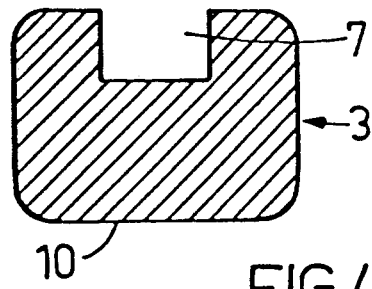
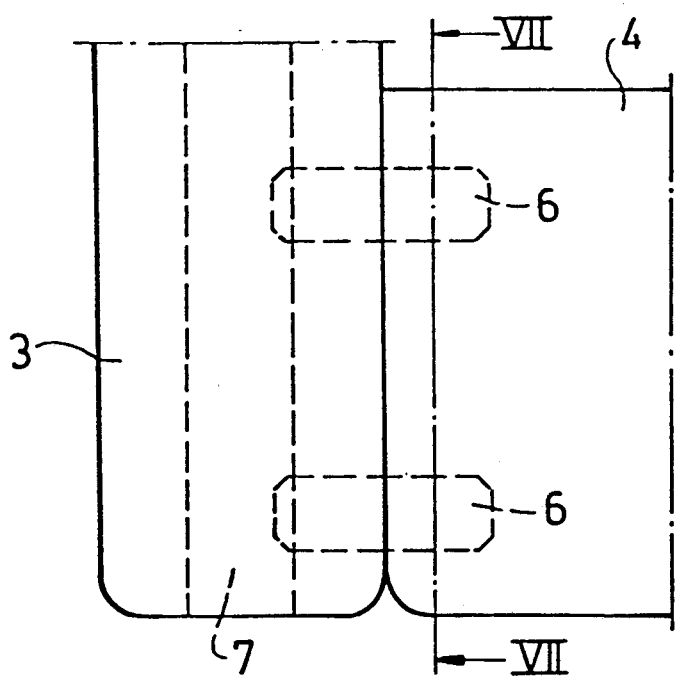
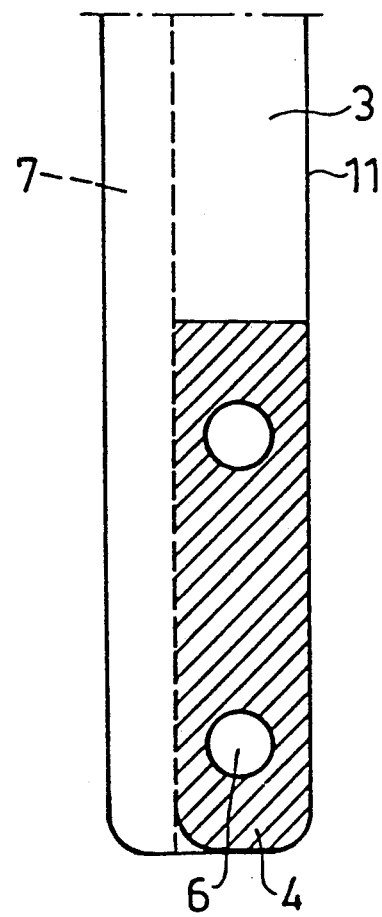

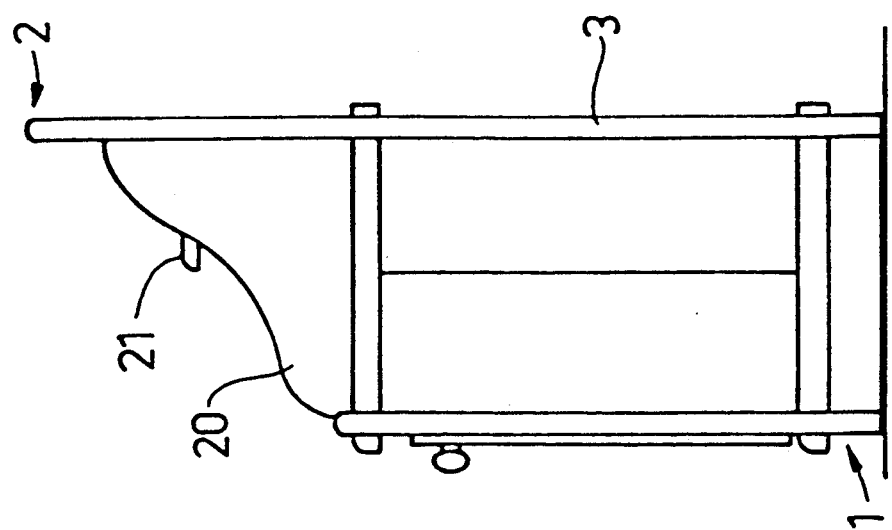
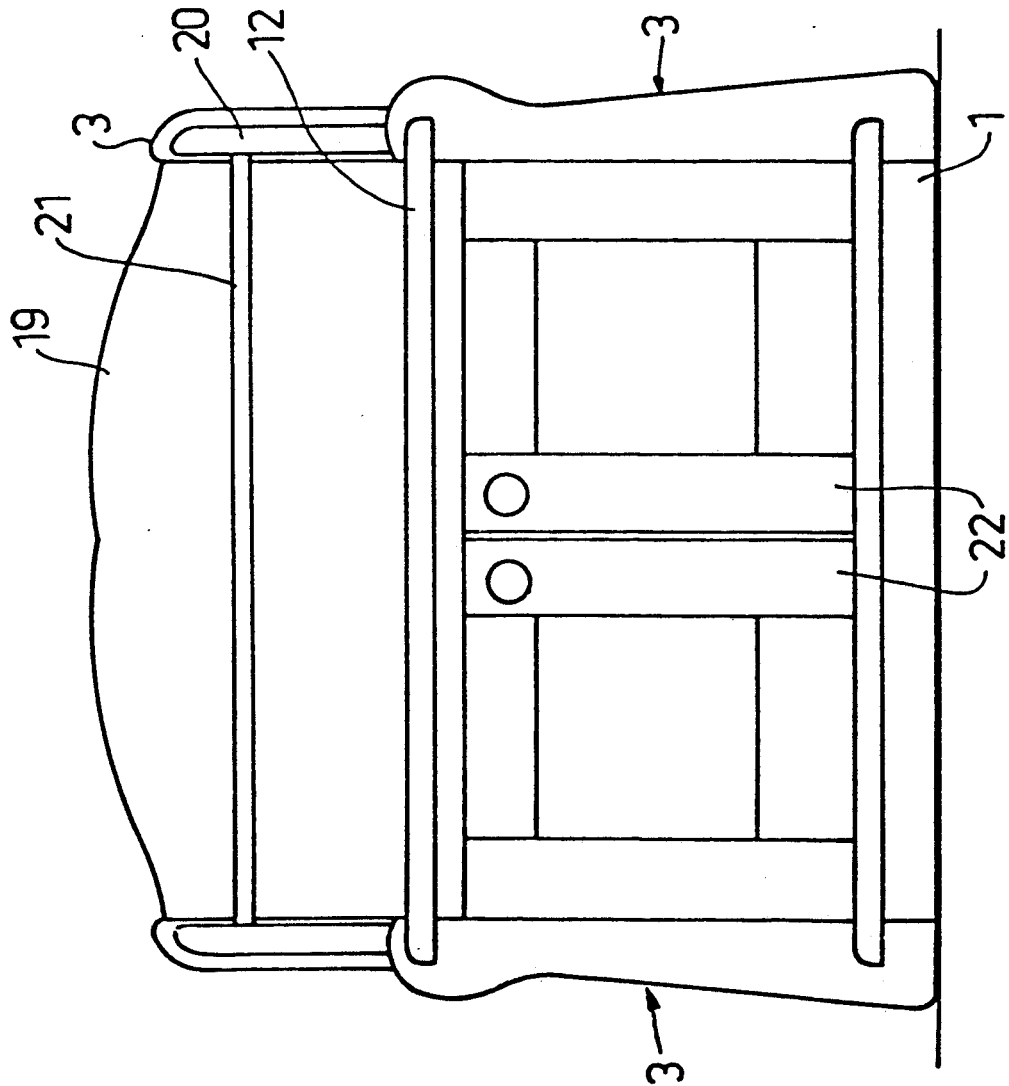

ASSEMBLABLE CARCASE

The present invention relates to a carcase for assemblable furniture, e.g. of the cupboard, counter and/shelf type, and includes at least two carrying frames with bottom and top members.

As is well known, furniture exists in a number of different forms and variations for a number of different purposes, but in a usable state all furniture is regarded in principle as very voluminous as freight. There is, however, assemblable furniture that is delivered from the factory via furniture shops to the customer, and which is packaged in a knocked-down state, the customer then having to look after the assembly of the different parts into a finished piece of furniture, either personally, or with the help of experienced persons. Assemblable furniture thus has the advantage that it can be packaged knocked down, and consequently it can be delivered in packages adapted for transport, i.e. such as have the least possible volume and greatest possible regularity, which of course are well suited to being stored.

Existing assemblable furniture, delivered knocked down for assembly in situ does not solely have advantages, and it is also burdened with disadvantages, above all with regard to the actual assembly, which often is complicated and impossible to accomplish single-handed. As well, there is also the situation that to achieve the necessary stability in such assemblable furniture when it is in an assembled state, a relatively large number of screw or bolt connections is required for joining the different parts together in a stable manner. These connections, necessary for joining the parts together, make manufacture substantially more expensive and assembly complicated, not least because special tools are also required for them. It has further been found that there are great problems in situating the parting places such that required strength is obtained as well as parts that have shapes enabling packaging adapted to transport and storage. Most often, both these demands can not be met, and certain compromises occur in one direction or the other.

The object of the present invention is therefore to achieve an assemblable carcase for furniture that does not have the mentioned drawbacks, and is simple to assemble, even for a single person, and which does not require any special screw or bolt connections to obtain the necessary stability of the furniture in question in its assembled state, as well as being able to be packaged in a manner suited to transport and storage.

This object is achieved by the carcase in accordance with the present invention having been given the characterising features disclosed in the accompanying claims.

Figure 2:
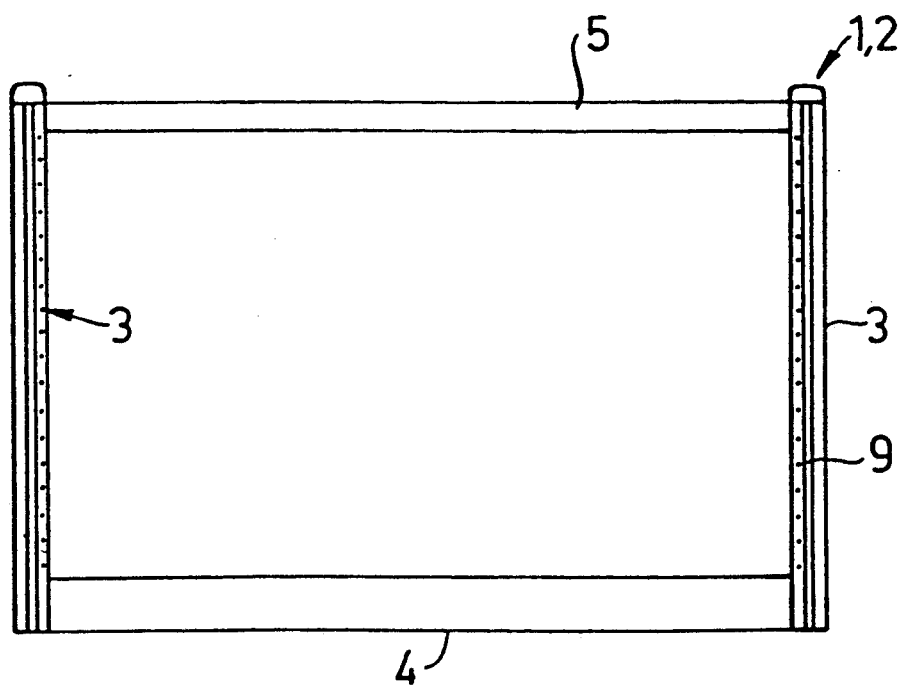
Figure 14:
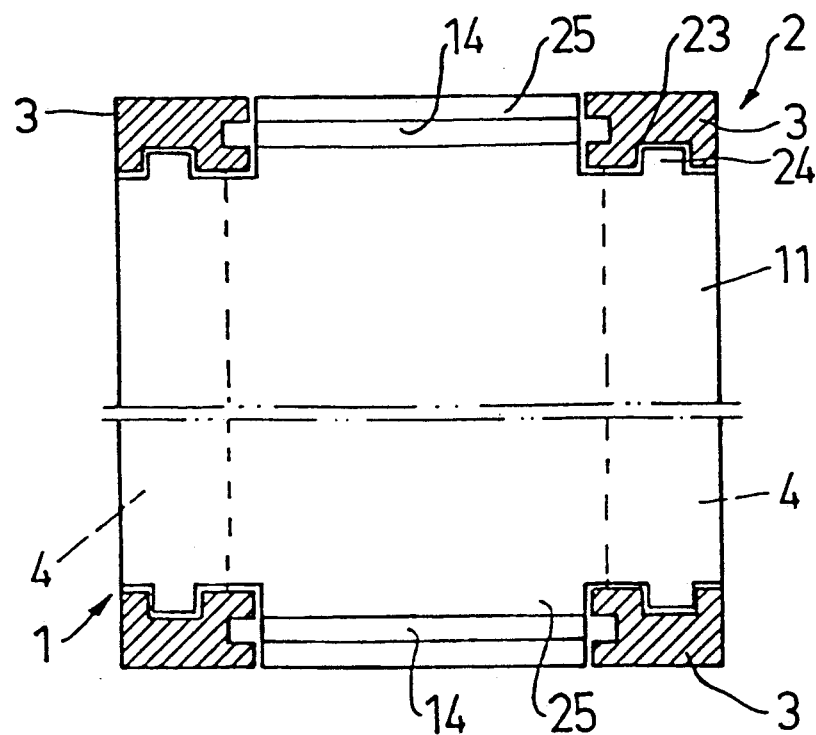
Figure 15:
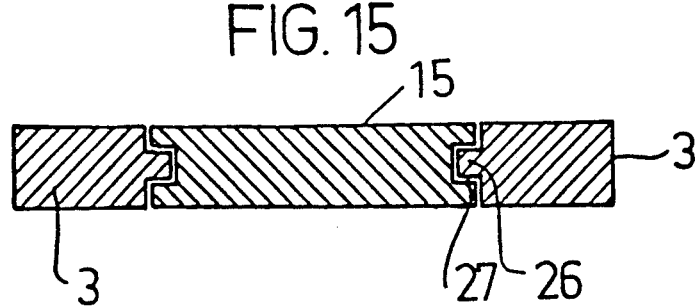

The invention will now be described in more detail, and with reference to the accompanying drawings, where FIG. 1 illustrates parts in an embodiment of the carcase intended for cupboards, benches and shelves, FIG. 2 is a side view of a carrying frame included in the carcase, as seen from the inside, FIGS. 3 and 4 respectively illustrate, to a larger scale and seen from the outside, an upper and a lower corner of a carrying frame, FIG. 5 is a section along the line V—V in FIG. 3, FIGS. 6 and 7 are respectively a section along the line VI—VI in FIG. 3 and a section along the line VII—VII in FIG. 4, FIGS. 8-11 are perspective views of different stages in assembling a carcase in accordance with the invention, FIGS. 12 and 13 are respectively a front view and an end view of a cupboard with a modified carcase in accordance with the invention, FIG. 14 is a horizontal section through an inventive carcase in an alternative embodiment of the carrying frame posts and the top and bottom members, and FIG. 15 is a horizontal section through an inventive carcase in an alternative embodiment of the carrying frame posts and end sides.

In accordance with the invention the carcase includes a front carrying frame 1 and a rear carrying frame 2, and in the embodiment according to FIGS. 1-11 they are made identically alike, but this is not necessary, as will be seen, inter alia from FIGS. 12 and 13. Each carrying frame 1,2 includes two posts 3, and at intended mutual spacing they are mutually joined with the aid of top and bottom cross members 5 and 4. At their ends these two members are joined to their respective posts 3 with the aid of pins 6, and glue, in the case where the carcase is of wood. If other material is used, e.g. steel, aluminium or the like, suitable means for a rigid connection between the cross members 4,5 and the posts 3 are used.

In a carrying frame 1,2 each post 3 is provided with a longitudinal groove 7, extending along the post from its bottom end and upwards at least flush with the upper side of the top cross member 5, as will be seen in FIG. 2. Above both the upper end of the groove and the top cross member each post 3 has its end portion 8 formed as a projection 8 which is laterally displaced in relation to the side 9 of the post in which the groove 7 is made. In the illustrated embodiment, this end 8 has a thickness equal to the total thickness of the post minus the depth of the groove 7, but may be both thinner or thicker, and neither does it need to have its side 10 facing away from the groove formed as a direct continuation of the corresponding side 11 of the post, as is illustrated in FIG. 6. This side 10 of the projecting end portion 8 can be recessed in relation to the post side 11. Both cross members 5,4 in a carrying frame may have the same thickness as the projection 8, but may be thicker than it and have the same thickness as the respective post 3.

On its inside, each post is suitably formed with suitably mutually spaced holes 9 (FIG. 2) for enabling positioning one or more shelves 10 (FIGS. 11 and 12) in a per se conventional manner.

Apart from both carrying frames 1 and 2, each inventive carcase includes a bottom member 11 and a top member 12 (FIGS. 1 and 10) which are shown as boards on the drawings, but may have any other form suited to their purpose. At their ends, both these members are provided with substantially U-shaped recesses 13. These recesses 13, seen in the plane of the respective member, are formed complemental to the cross section of the posts included in the carrying frames 1,2 for the bottom member 11, and complemental to the cross section of the end portions 8 for the top member 12, such that the four projections 8 on the posts of both carrying frames 1,2 are a relatively tight fit in the recesses 13 of the top member 12. This also applies to the fit between the recesses 13 of the bottom member and the posts 3. The recesses in both members shall have a depth at least corresponding to the post width, and if wood is used thet shall extend in the direction of the grain of the wood.

At its end portions the bottom member 11 is also provided or formed with transverse grooves 14 between its recesses 13, the distance between both grooves 14 being the same as the distance between the grooves 7 in the posts of each carrying frame. The top member 12 may also be provided or formed with such transverse grooves on its underside.

Two end sides are included in the inventive carcase, and are shown as boards on the drawings, but may have the form of a cross with fixed or mutually turnable arms, or some other form, although these end sides 15 have, at least along their longitudinal and transverse edge portions, a thickness corresponding to the width of the grooves in the posts 3 and the transverse grooves 14 in the bottom member, and the top member when applicable.

Figure 8:
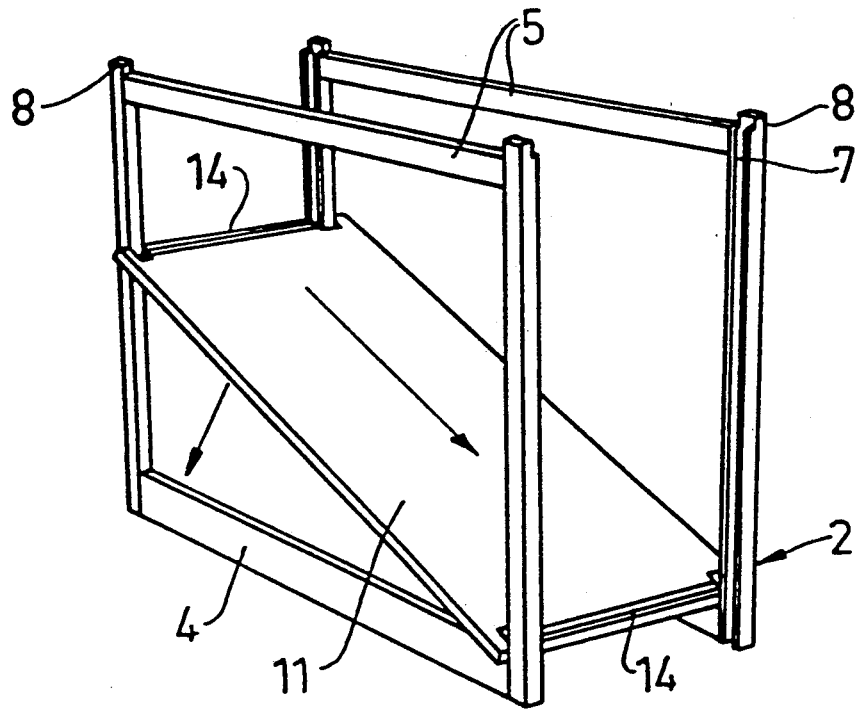

Properly assembled, these parts 1,2,11,12 and 15 form a carcase in accordance with the present invention, and their assembly is suitably proceeded with as follows. The two carrying frames are placed facing each other at an approximate distance corresponding to the distance between the recesses 13 in the top and bottom members. The bottom member 11 is then inserted roughly diagonally between the two carrying frames, and the recesses 13 are taken into engagement with the posts 3 of the carrying frames, starting at the lower end of the sloping member 11, and then at its upper end, which is urged downwards into engagement against the bottom cross member 4 of the carrying frames, thus causing the recesses 13 at either end of the bottom member 11 to tightly surround their respective posts 3. The carrying frames 1,2 will thus be fixed mutually parallel with the aid of the bottom member 11, as illustrated in FIG. 8, and where the grooves 7 and 14 at either end of the carcase being assembled are in a single vertical plane. The bottom cross members 4 of the carrying frames serve as support for the bottom member 11, and also as front and rear skirting of the carcase.

Figure 9:
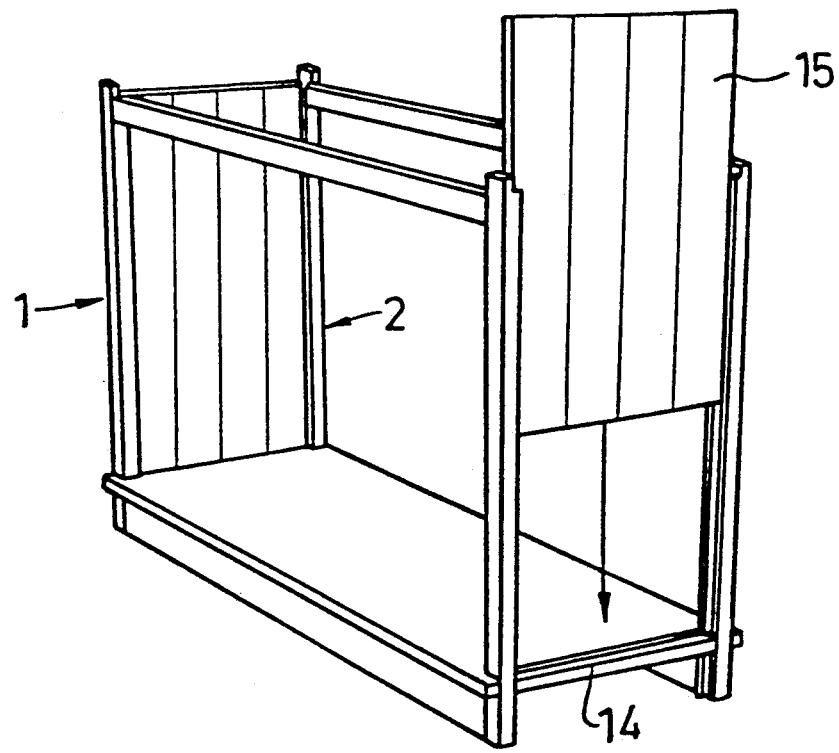
Figure 10:
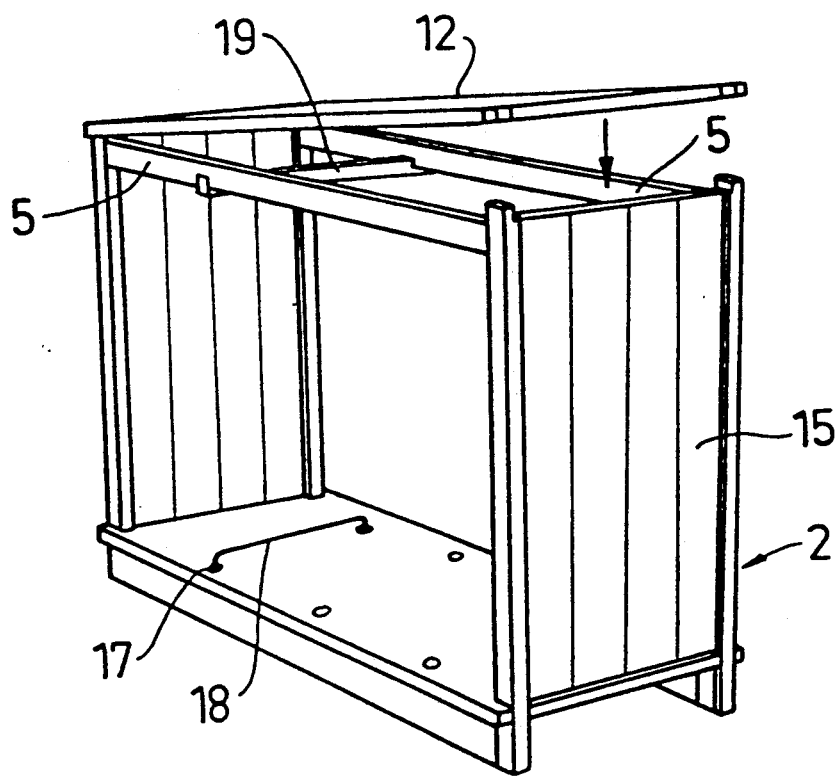

After the bottom member has been put in place, each end side member is is thrust down into the grooves 7 of mutually opposing posts 3 of the carrying frames, as shown in FIG. 9, the bottom end of each end side member being finally accommodated in the transverse groove 14 at the respective end of the bottom member.

There then remains placing the top member 12 such that its recesses 13 accommodate the end portions 8 of the posts 3. When fitted in position, the top member 12 engages with its underside against the top cross member 5 in each frame, and also against the top end of each end side member for engagement in the transverse grooves on the underside of the top member 12, where such grooves are provided. For fixation of the carcase thus obtained the top member 12 may be screwed to the top cross members 5 with a number of screws, using holes that can be pre-drilled in the cross members. The now assembled parts of the carcase are thus mutually locked and the carcase thus obtained is very stable and firm.

Figure 11:
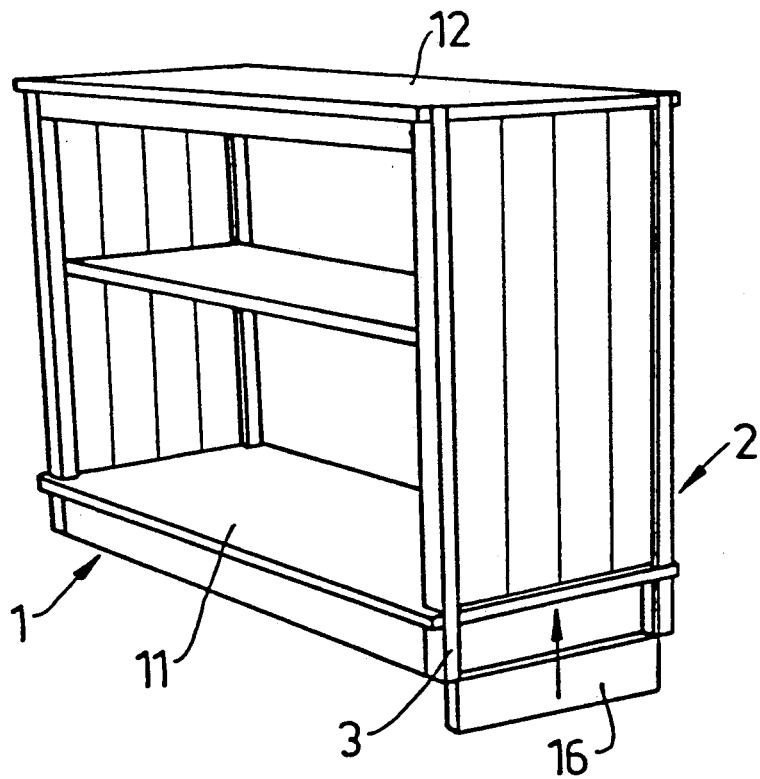

If so desired, the end sides 15 of the carcase can also be provided with skirting, as is shown in FIG. 11, by inserting a suitable piece of material from below into the opposing grooves 7 in posts 3 at either end of the carcase. In FIG. 11 the carcase is illustrated in an assembled state and provided with a shelf 10 carried by means known per se in holes 9 on the inside of the posts. Instead of shelves, vertical partition walls can be arranged inside the carcase. For this purpose the bottom member 11 is suitably provided with holes 17 (FIG. 10) for wire bows 18, and the top cross members 5 of both carrying members are provided with slots for accommodating rails 19, which project somewhat from the underside of these members and are situated directly opposite the holes 17 or bows 19 arranged on the bottom member. The partition walls are provided with grooves in their end surfaces for accommodating the mentioned rails and bows, and are pushed into place, with the rail or bow accommodated in its respective groove, in a conventional way.

The inventive carcase is simple to assemble, and can be assembled very quickly by anybody without any help, i.e. one person can assemble it by himself. In addition, the carcase is very stable in its assembled state, even to the extent that it does not require a rear panel or the like to stiffen it and give it the necessary rigidity. Another advantage with the inventive carcase is that due to its implementation it affords great possibilities for varying the adopted colour scheme, decoration etc to provide furniture with a pleasing appearance.

A possible variant is illustrated as an example in FIGS. 12 and 13, and is in the form of a sideboard, the front carrying frame 1 of which has decorated posts 3 and is lower than the rear carrying frame 2 of the cupboard. The frame 2 is provided with a panel 30, at least above the top member 12, the panel being accommodated in grooves in the appropriate faces of the posts 3 of the rear frame 2. In this embodiment, the end portions 8 of the posts are not given any special configuration, and the recesses 13 in the top member 12 accommodate the normal cross section of the posts. The grooves 7 in the posts of both frames are used for fixing the side ends 20 of the sideboard, these ends also carrying between them a shelf 21 in unillustrated grooves. The grooves 7 in the posts of the rear frame 2 can have a length above the top member 12 corresponding to the height of the respective end side 20. The sideboard is also illustrated with doors 22, which are hung conventionally.

In the alternative embodiment according to FIG. 14, each of the posts 3 in a frame 1,2 is provided with a groove 23 on the side of the post facing towards the other post. At least the bottom member 11 in this embodiment has its recesses 13 replaced by tongues 24 accommodated in the grooves 23, which extend in each post 3 at least between the top and bottom cross members 5,4 of the frame, but may also extend the full length of the post, the cross members 4,5 then suitably having their end portions formed as tongues fitting into the grooves 23, and being otherwise fixed to the posts in a suitable manner, such as the one already described. The width of the tongues 24 and grooves 23 should be substantially the same to avoid lateral play, and the projecting length of the tongues should be slightly less than the depth of the grooves 23. In such a case the bottom member 11 should have a length between the end surfaces of the tongues 24 corresponding to the distance between the bottoms of the grooves 23 in the posts 3 of a frame.

The bottom member 11 illustrated in FIG. 14 is also formed with end portions 25 situated between a post 3 in each frame, these portions being provided with the grooves 14 intended for the respective end side 15. The top member 12 may be of the same implementation as in FIGS. 1-13, but can also be formed in the same way as the bottom member illustrated in FIG. 14, or completely or partially without the projecting end portions 25. If the top member completely or partially lacks the end portions 25, the end sides 15 may be given a length such that with one end against the bottom member 11 the other end is flush either with the upper side of the top member, or with the upper end surfaces of the posts. Other variations are also possible within the scope of this invention, and as an example of such may be mentioned that the bottom member 11 may completely or partially lack the end portions 25, in which case the end sides 15 can be given a length allowing them to extend down past the bottom member in the assembled state of the carcase, and thus replace the end side skirting 16.

In FIG. 15 there is illustrated an alternative embodiment of a joint between the posts 3 and associated end side 15. This joint comprises a tongue 26 on the post 3 and a groove 27 on the end edge portion of the end side 15.

The present invention is not restricted to what has been described above and illustrated on the drawings, and it can be amended and modified in many different ways within the scope of the inventive concept disclosed in the claims.

I claim:

1. A carcase for assemblable furniture, said carcase comprising two horizontally spaced frames (1,2), each of said frames including a pair of horizontally spaced, vertical posts (3), each of said posts including an inner surface facing the other of said frames and having therein a vertically extending groove (7), said carcase further comprising a plurality of horizontally extending board-like members (11,12) supported by said frames, each of said board-like members including opposed end surfaces, each of said end surfaces having therein a pair of generally U-shaped recesses (13) each receiving a respective one of said posts and being located in the plane of the respective frame, and said board-like members including a bottom member (11) and a top member (12), and said carcase further comprising a pair of vertically extending end panels (15), each of said panels having one longitudinal edge portion received in said groove of a respective one of said posts of one frame, and an opposite longitudinal edge portion received in said groove of a respective one of said posts of the other frame, said panels being inserted in said grooves before said top member is fitted on said frames, and said frames being connected only by said board-like members.

2. Carcase as claimed in claim 1, characterised in that both top (12) and bottom (11) members have locking means (13;24) adjacent said end surfaces for engaging coaction with said posts (3) for the mutual fixation of said frames.

3. Carcase as claimed in claim 2, characterised in that the locking means of the bottom member (11) comprises said recesses (13) accommodating said posts (3).

4. Carcase as claimed in claim 2, characterised in that the locking means of the bottom member (11) comprises tongues (24) for engaging coaction with grooves (23) in said posts.

5. Carcase as claimed in claim 3, characterised in that the locking means of the top member (12) comprises said recesses (13) accommodating said posts.

6. Carcase as claimed in claim 3, characterised in that the locking means of the top member comprises tongues (24) for engaging coaction with grooves (23) in said posts.

7. Carcase as claimed in claim 1, characterised in that further to said posts the frames (1,2) each include a top (5) and bottom (4) cross member joining said posts rigidly to each other and constituting support for the top (12) and bottom (11) members in the assembled state of the carcase.

8. Carcase as claimed in claim 7, characterised in that the posts in each frame (1,2) are formed above the top cross member (5) as tongues (8) having less cross sectional area than the rest of said posts, each such tongue being laterally displaced in relation to the side of the post in which the groove (7) for the end panel (15) is made.

9. Carcase as claimed in claim 1, characterised in that at least along said longitudinal edge portions the end panels 15 have a thickness corresponding to the width of the grooves (7) in said posts.

10. Carcase as claimed in claim 3, characterised in that the recesses (13) in both top (12) and bottom (11) members have an edge and an extention inwards from the edge of the member corresponding at least to the width of said posts.

11. Carcase as claimed in claim 1, characterised in that the end panels have lower end portions and the bottom member (11) is provided with grooves extending between the recesses (13) for accommodating the lower end portions of the end panels.

12. Carcase as claimed in claim 1, characterised in that the end panels have upper end portions and the top member (12) is provided with grooves (14) extending between said locking means (13;24) for accommodating the upper end portions of the end panels.

13. Carcase as claimed in claim 1, characterised in that it also includes a skirt member (16), one for each end, insertable from below in the groove of a post in one frame facing towards the groove in another frame.

14. A carcase for assemblable furniture, said carcase comprising two horizontally spaced frames, each of said frames including a pair of horizontally spaced, vertical posts, each of said posts including an inner surface facing the other of said frames and having therein a vertically extending groove, said carcase further comprising horizontally extending top and bottom board-like members supported by said frames, each of said frames also including a top cross member joining said posts rigidly to each other and constituting support for said top member, and each of said posts being formed above said top cross member as a tongue having less cross sectional area than the rest of said post, each such tongue being laterally displaced in relation to said inner surface of said post, and said carcase further comprising a pair of vertically extending end panels, each of said panels having one longitudinal edge portion received in said groove of a respective one of said posts of one frame, and an opposite longitudinal edge portion received in said groove of a respective one of said posts of the other frame.

15. A carcase for assemblable furniture, said carcase comprising two horizontally spaced frames, each of said frames including a pair of horizontally spaced, vertical posts, each of said posts including an inner surface facing the other of said frames and having therein a vertically extending groove, said carcase further comprising horizontally extending top and bottom board-like members supported by said frames, said top member having a lower surface and said bottom member having an upper surface, one of said lower surface and said upper surface having therein first and second grooves, and said carcase further comprising a pair of vertically extending end panels, each of said panels having one longitudinal edge portion received in said groove of a respective one of said posts of one frame, and an opposite longitudinal edge portion received in said groove of a respective one of said posts of the other frame, and each of said panels being received in a respective one of said first and second grooves.

16. A carcase for assemblable furniture, said carcase comprising two horizontally spaced frames, each of said frames including a pair of horizontally spaced, vertical posts, each of said posts including an inner surface facing the other of said frames and having therein a vertically extending groove, said carcase further comprising horizontally extending top and bottom board-like members supported by said frames, said carcase further comprising a pair of vertically extending end panels, each of said panels having one longitudinal edge portion received in said groove of a respective one of said posts of one frame, and an opposite longitudinal edge portion received in said groove of a respective one of said posts of the other frame, and said carcase further comprising a pair of skirt members, each of said skirt members having one longitudinal edge portion received in said groove of a respective one of said posts of one frame, and an opposite longitudinal edge portion received in said groove of a respective one of said posts of the other frame, and said skirt members being insertable from below into the respective grooves in said posts.

* * * * *